United States Patent [19]
Philippi

[11] Patent Number: 5,052,596
[45] Date of Patent: Oct. 1, 1991

[54] UNIT FOR MELTING AND DISCHARGING SOLID PRODUCTS OUT OF BARRELS

[75] Inventor: Karl-Heinz Philippi, Gelsenkirchen-Buer, Fed. Rep. of Germany

[73] Assignee: Veba Oel Technologie GmbH, Gelsenkirchen, Fed. Rep. of Germany

[21] Appl. No.: 461,381

[22] Filed: Jan. 5, 1990

[30] Foreign Application Priority Data

Jan. 12, 1989 [DE] Fed. Rep. of Germany ....... 3900696

[51] Int. Cl.$^5$ ............................................ B22D 35/06
[52] U.S. Cl. .................................. 222/593; 266/901; 432/31
[58] Field of Search ........................ 222/593; 266/901; 75/401, 403; 432/31, 253; 110/346

[56] References Cited

U.S. PATENT DOCUMENTS

| Re. 3,258 | 1/1869 | Sturdevant et al. | 75/401 |
| 57,252 | 8/1866 | Goty et al. | 75/401 |
| 75,809 | 3/1868 | Sturdevant et al. | 75/401 |
| 81,164 | 8/1868 | Harmon et al. | 75/401 |
| 3,163,134 | 12/1964 | Stratford | 75/403 |
| 4,285,328 | 8/1981 | Fritz et al. | 110/346 |
| 4,667,850 | 5/1987 | Scholl et al. | 222/593 |
| 4,881,972 | 11/1989 | Weber et al. | 266/901 |

FOREIGN PATENT DOCUMENTS

| 1788845 | 5/1959 | Fed. Rep. of Germany . |
| 3706927 | 9/1988 | Fed. Rep. of Germany . |
| 430035 | 2/1964 | Switzerland . |
| 8905278 | 6/1989 | World Int. Prop. O. . |

Primary Examiner—S. Kastler
Attorney, Agent, or Firm—Oblon, Spivak, McClelland, Maier & Neustadt

[57] ABSTRACT

In order to melt and discharge solid and highly viscous products from barrels, the barrels are opened and placed upside down on a foraminous frame. The frame with the barrels placed thereon is then inserted through the open top of a heated vessel defining a heating chamber therein. After covering the top of the vessel, the heating chamber is heated so that the product melts and flows out of the barrels, through the frame and is discharged from the vessel. The discharged product may be stored in a heated storage container.

5 Claims, 1 Drawing Sheet

UNIT FOR MELTING AND DISCHARGING SOLID PRODUCTS OUT OF BARRELS

BACKGROUND OF THE INVENTION

1. Field of the Invention

The invention relates to a unit for melting and discharging solid or highly viscous products out of barrels.

2. Background of the Related Art

Emptying products that at normal temperatures are solids or highly viscous out of barrels, or re-melting products that have been shipped in barrels, are intended for further processing and have solidified at outside temperatures, is a common industrial task. Products collected in barrels are to be found in the most varied branches of industry, particularly in the chemical and the petroleum industries or in the refinery sector, for example where heavy oil must be cleaned out of tanks or during work or repairs on units such as visbreakers, hydrocrackers and the like. In some cases, such residues, for example the residues in units for the conversion of hydration of heavy oils or heavy oil residues, may become brittle at ambient temperatures.

In DE 37 06 927 A1 there is described a barrel melting device that can be installed on the spot and liquefies only the desired quantity of meltable product. This melting device works by inserting a heatable hosepipe, adjustably heated in accordance with the desired degree of liquefaction of the material to be melted, into the contents of the barrel.

This patent also teaches that the meltable product can be heated in its entirety in the barrel at a separate station, and so brought to the liquid state, so that the liquid mass can then be conveyed for further processing. Such devices are usually designed as electric heating chambers or steam heating chambers, optionally with air circulation. The barrels and their contents, after heating, must be handled and emptied in separate operating steps. It should also be borne in mind that such a procedure is not recommended for melted products by use of steam chambers using steam pressure values in the higher ranges.

SUMMARY OF THE INVENTION

An object of the present invention is to avoid these disadvantages.

The above, and other objects, are achieved according to the present invention by an apparatus for melting and discharging solid or highly viscous products from barrels, comprising a vessel having a open top and a conical bottom, heating means on the vessel for forming a heating chamber in the vessel, a frame comprising means for supporting at least one open barrel having the product with an opening of the barrel facing downward, wherein the frame is supportable in the heating chamber so that the product may be heated and flow out of the barrel, and discharge means in the conical bottom for discharging melted product from the vessel.

According to a further feature of the invention, there is provided a cover for closing the open top of the vessel.

A method for melting and discharging solid or high viscous products from barrels comprises the steps of positioning open barrels, with open ends down, on a foraminous support frame, placing the frame having the barrels positioned thereon in a heating chamber of a vessel having heating means and discharge means, and heating the vessel so as to melt the product, whereby the product flows through the frame and out of the vessel via the discharge means.

According to one advantageous embodiment, the frame supporting the barrels can be inserted in the vessel from above.

According to another embodiment, the frame may be equipped with a discharge hopper.

The melting unit thus consists of a heating chamber composed of an open vessel with heating system, a conical floor, discharge pipes for the melted product and a cover. It is advantageous to equip the vessel with an internal heating system so that radiant heat can be applied directly to the barrel to be heated. Moreover, heating can be accomplished by means of low-pressure steam, medium-pressure steam, thermal oil, electrical resistance heating or inductive heating of the contents of the barrel.

A frame with a closable discharge hopper supports the barrels with their openings facing downward and can be designed so that it can be inserted into the vessel from above.

It is helpful if the vessel may be locked shut with a convex cover equipped with a quick-locking device, such as a quarter-turn fastener. Towards the center of the cover a pivoting arm can be fastened that makes it possible to leave the opening of the vessel completely free by unfastening the lid and swinging it around a pivoting axis positioned outside the container.

On the inside wall of the heating chamber is mounted a heating coil, for example one which can be heated with medium-pressure steam, low pressure steam or thermal oil.

The cone of the conical vessel floor, which may have a slope of 60°, for example, is equipped with discharge pipes and is preferably surrounded by an external heating coil. It may, however, be equipped with an electric rod heating.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
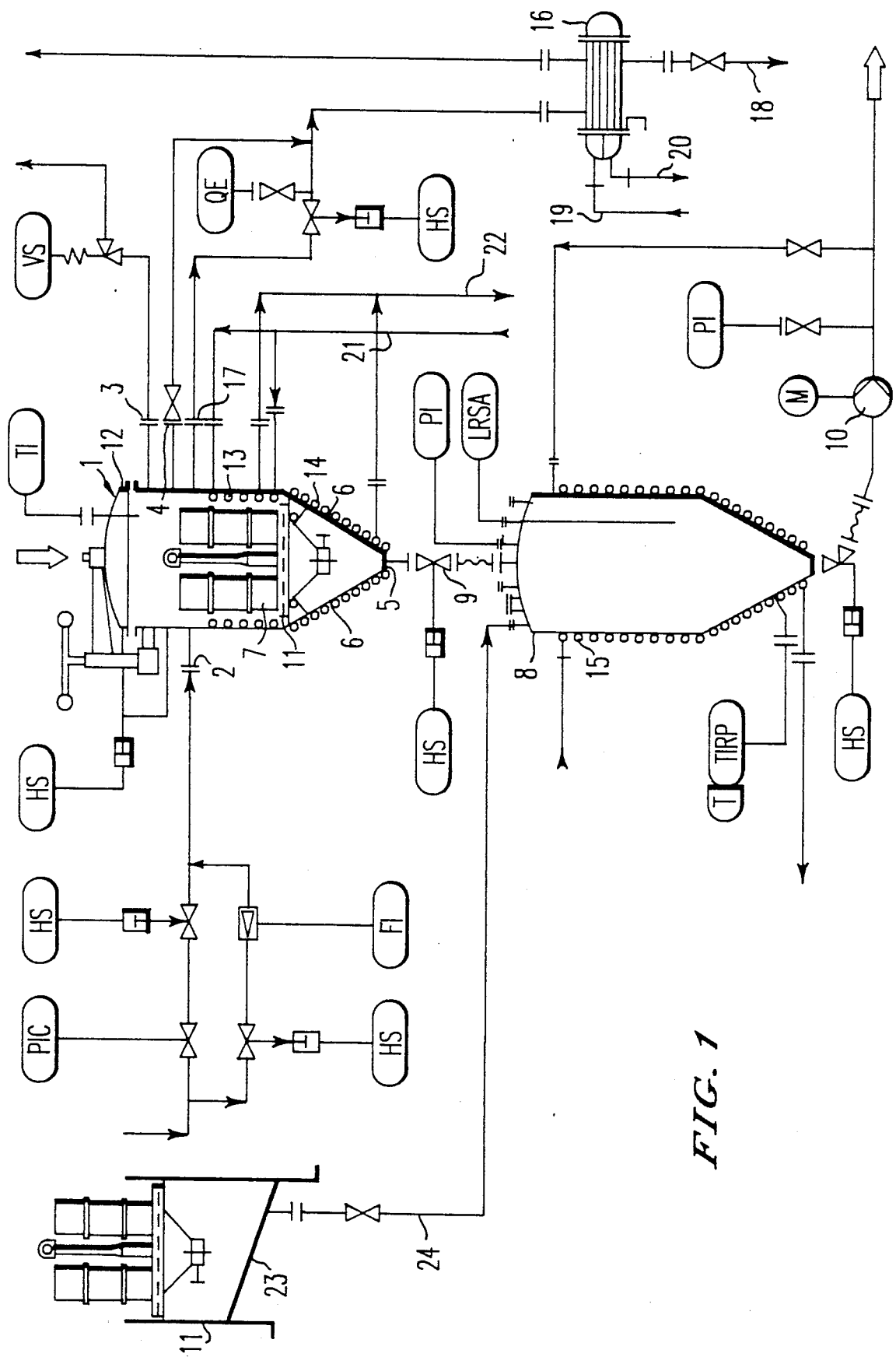
FIGURE 1 is a schematic view of a melting system according to the invention.

The heating chamber with a storage container placed underneath, is illustrated in FIGURE 1, together with the requisite installations for measurement, control and adjustment.

Barrels 7 are supported by a frame 11. The frame consists, for example, of a ring having cross-bars, on which is laid a light-grid screen, i.e., the frame is foraminous. The use of the light-grid screen with a specific mesh width avoids discharge problems in the cone, since only lumps smaller than a certain size can pass through the light-grid screen. A discharge hopper is mounted below the ring. Extending upward from the center of the frame is a connection part for a crane, for example.

By means of a conventional barrel grip, the barrels, after their lids are removed, are loaded on the frame 11 in a pivoting procedure with their openings facing downward. The frame 11 is preferably positioned in a drain trough 23 while the barrels are loaded. Any surface liquid that may be present is conducted directly to a storage container 8 from the drain trough 23 via a line 24.

The frame 11 including its discharge hopper and the barrels 7 can be conveyed by means of a crane directly to the heating chamber 1, lowered into it and set on a support ring in the heating chamber, which may include a heating coil.

The heating chamber 1 is equipped with pipes 2 for nitrogen scavenging, a pressure safety mechanism in the form of a safety valve 3 to the open air, a pressure release mechanism 4 for use while the cover 12 is open, pressure and temperature controls and the outlet pipe 5 in the conical floor 6.

Upon heating of the heating chamber 1 by the heating coils 13 and/or 14, the product in the barrels 7 melts and flows through the light-grid screen. The melted product in the barrels 7 may, for example, be allowed to flow directly into the storage container 8 positioned underneath the heating chamber 1 past a shut-off device 9. By means of a pump 10, the melted product from the storage container can either be returned to the process from which it was diverted, forwarded to another processing stage or drawn off for use.

The FIGURE shows the vessel 1 with an internal heating coil 13 and an external heating coil 14. Inside the heating chamber there is schematically depicted the inserted frame 11 with its discharge hopper and the barrels 7. Underneath the heating chamber are discharge pipes 5 positioned on the conical floor 6 for discharging the melted product to the storage container 8. The storage container 8 for the melted product may be heated by an external heating coil 15.

By means of a condenser 16, vapors issuing from the vessel through pipe 17 can be condensed and conducted away via line 18 as condensate. Lines 19 and 20 are designed to convey cooling water to and from the condenser. Lines 21 and 22 are designed to convey heat carriers, such as medium-pressure steam or medium-pressure condensate to the heating coils 13 and 14 to heat the vessel 1.

With the device described above, materials that solidify at ambient temperature can be economically emptied from barrels without danger from the hot products and vapors deriving from the products, and conveyed for further processing. Depending on the design of the device and the corresponding frame for the barrels, four 200-liter barrels, for example, can be handled simultaneously. Other cask or drum-like containers can also be handled.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for melting and discharging solid or highly viscous products from barrels, comprising:
   a vessel having an open top and a conical bottom;
   heating means comprising heating coils in said vessel for forming a heating chamber in said vessel;
   a frame comprising means for supporting at least one open barrel having the product with an opening of the barrel facing downward, wherein said frame is supportable in said heating chamber so that the product may be heated and flow out of the barrel;
   discharge means in said conical bottom for discharging melted product from said vessel, and
   a cover for closing the open top of said vessel.

2. The apparatus of claim 1 wherein said frame is shaped such that said frame can be inserted in said vessel through said open top, and comprises:
   a ring;
   a grid on said ring;
   a discharge hopper mounted below said ring; and
   a central part comprising means for connecting a lifting crane to the frame.

3. The apparatus of claim 1, including a heated storage container positioned below said vessel and connected to said discharge means.

4. The apparatus of claim 1, including a vapor condenser fluidically connected to said heating chamber.

5. The apparatus of claim 3, including a drain trough having means for supporting said frame and having a trough discharge connected to said storage container.

* * * * *